Figure 1:
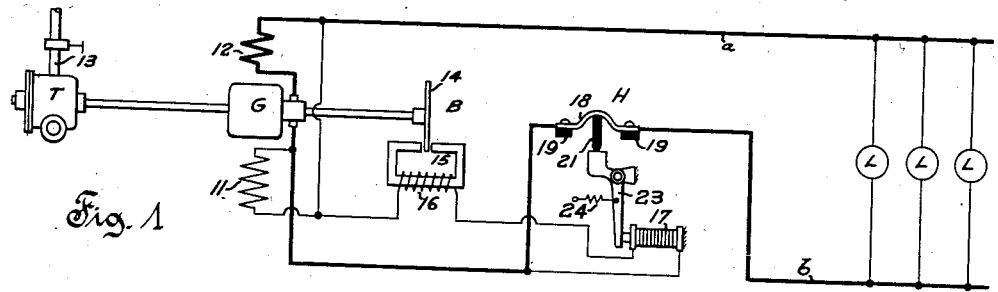

June 5, 1928.

J. J. KANE 1,672,847

ELECTRICAL POWER SYSTEM

Filed April 19, 1921

2 Sheets-Sheet 1

Inventor
J. J. Kane
by
Attorney

June 5, 1928.  
J. J. KANE  
ELECTRICAL POWER SYSTEM  
Filed April 19, 1921  
1,672,847  
2 Sheets-Sheet 2
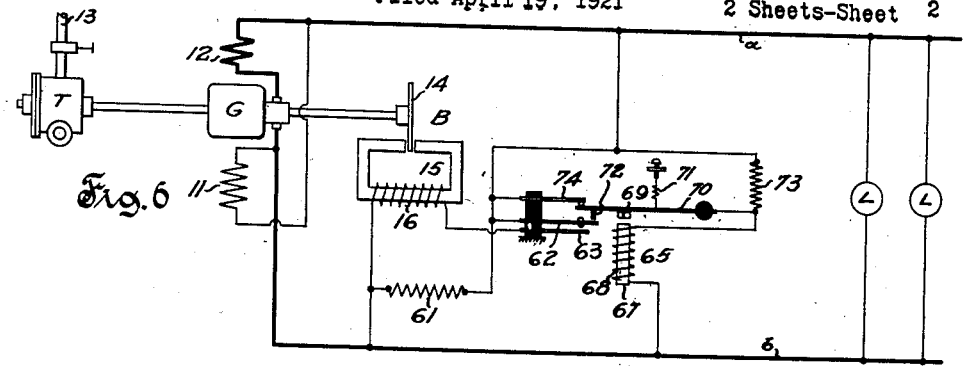
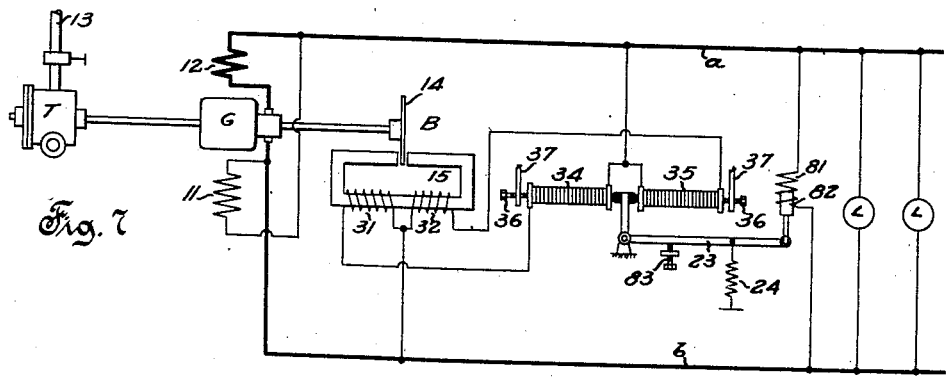
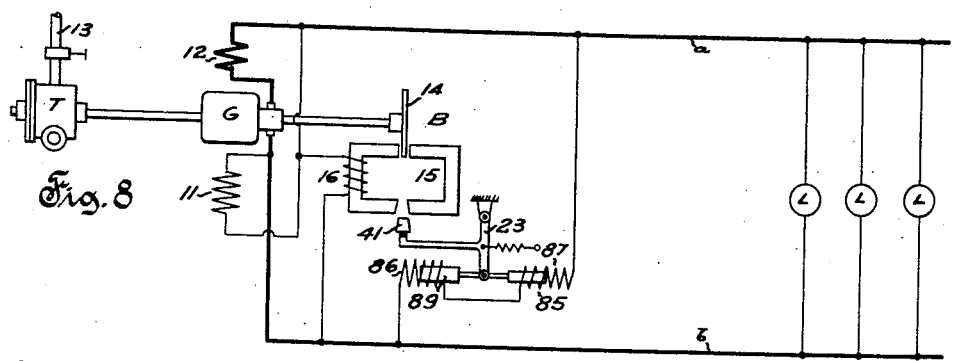
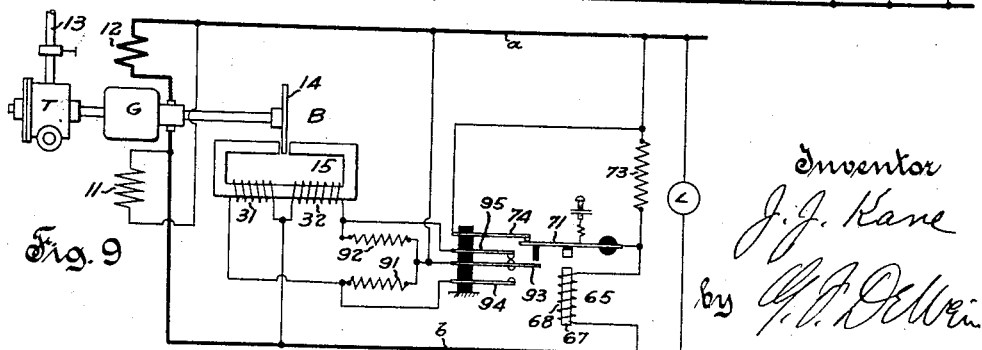
Inventor  
J. J. Kane  
by  
Attorney Patented June 5, 1928.

1,672,847

UNITED STATES PATENT OFFICE.

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ELECTRICAL POWER SYSTEM.

Application filed April 19, 1921. Serial No. 462,520.

This invention relates in general to electrical power and distribution systems, and has particular relation to devices or apparatus for regulating generators driven by prime-movers, such as engines or turbines connected to supply variable electrical loads, especially where there is a tendency for the generator-driving means to operate at a speed dependent upon the load.

In certain installations, as where a steam turbine drives a generator, usually through a direct connection therewith, for supplying a variable electrical load, such as lights on a railway train or the locomotive thereof, means are necessary for regulating or limiting the speed of the turbine on the loss of a portion of the normal load on the generator. It will be obvious, that, if the generator were permitted to operate at a greatly increased speed on the removal of a portion of its normal load, the voltage on the lamps or other translating devices constituting the load on the generator, might rise to a dangerously high value; and this is especially the case where the load comprises lamps of the incandescent type, where a comparatively small increase in voltage above that value for which the lamps are designed, may be highly injurious to the life of the lamps. Again, unless some means is provided for effectively limiting the speed of the generator and the turbine driving the same to a safe operating value on the removal of generator load, there is liable to be unnecessary wear and strain upon the generator and turbine, and even considerable danger to these elements of the system.

In accordance with this invention, improved means are provided for regulating the speed of the prime-mover and the speed and output of the generator, an object of the regulating means provided being to maintain a characteristic, such as the voltage, of the energy supplied by the generator substantially constant independently of any tendency of the prime-mover to operate at a variable speed dependent upon the load on the generator. For this regulating purpose, an artificial load is provided which takes the place of the electrical load removed from the generator circuit, the regulation being effected in response to variations in the electrical load on the generator. This method of regulating the set involves considerable economy as to power used for braking purposes, especially when there is normal or full load on the generator, there being no appreciable loss due to any drag exerted by the brake at this time; and it also has the desirable feature that the power rating of the generator and the prime-mover need not be appreciably greater than is necessary to supply the normal or full electrical load on the generator.

It is an object of this invention to provide a system comprising a generator supplying a load of a variable character, and improved means for controlling the voltage of the generator as desired and independently of the load thereon.

It is a further object of this invention to provide a system of distribution comprising a generator supplying a load of a variable character and driven by fluid-operated means which automatically tends to increase its speed on loss of load, and improved means for maintaining the voltage of the generator substantially constant independently of the load on the generator, while at the same time confining the speed of the generator and its driving means to a desired limiting value.

It is a further object of this invention to provide for a system of the character described, improved regulating apparatus comprising an electrically operative brake and means for effectively energizing the brake to a degree responsive to the load on the generator and its driving means, for the general purpose of maintaining a substantially constant load upon the turbine independently of the value of the electrical load on the generator.

These and other objects and advantages are attained by this invention, the various novel features of which will appear from the description and drawings, disclosing several embodiments of the invention, and will be particularly pointed out in the claims.

In the accompanying drawings:

Fig. 1 is a diagrammatic showing of a system involving features of this invention.

Figs. 2 to 9, inclusive, are diagrammatic views showing modifications of the system of Fig. 1.

In the embodiment of the invention disclosed in Fig. 1, a generator G is driven by a prime-mover, such as a steam turbine T which is preferably mounted on the generator shaft. The turbine T is of a character such that, with a definite throttle setting and inlet pressure, the speed of the turbine tends to vary inversely as the load thereon. The shunt field of the generator is indicated at 11 and the series field at 12, the machine terminals being connected to the distribution circuit $a$, $b$, which supplies a number of elements of a variable load L which may be considered as a lamp load. The turbine T is provided with an inlet 13 of adjustable size, although, in the ordinary operation of the system, the inlet opening usually remains constant when once adjusted, this adjustment depending upon the normal generator speed desired under conditions of full load on the generator, and the working pressure of the steam at the turbine inlet. This pressure may be considered as being maintained substantially constant, as by means of a reducing valve or otherwise. A brake B is provided, the same being designed to act as an artificial load on the shaft of the generator and turbine, this brake comprising a disk 14 of conductive material mounted on the shaft and rotatable between poles of an electromagnetic field element 15 which is energized by a winding 16 connected in shunt to the terminals of the generator G. As will be apparent, with the type of brake shown, the currents induced in the disk 14 and the consequent braking effect exerted by the disk on the shaft of the turbine and generator are proportionate to the flux present in the field element 15 of the brake and cutting the disk which operates in the air-gap of the field element of the brake.

Under conditions of normal load on the generator, that is, the full quota of lamps L which the particular system is designed to carry, it is intended that there shall be a minimum or no substantial braking effect exercised by the brake B on the turbine shaft, substantially all of the energy of the turbine being considered useful energy spent in maintaining the electrical load on the generator, the latter, especially through its field windings, being so designed as to produce the required electrical energy at the desired normal voltage under this full load condition. When a portion of the electrical load, in the form of one or more lamps, is removed from generator circuit, there is a tendency of the turbine speed, and, hence, the voltage at the generator terminals to increase.

An adjustable resistance 17 is provided in series with the shunt energizing winding 16 of the field element 15 of the brake B. This adjustable resistance is preferably in the form of a carbon-pile resistance 17, as indicated. An electrically operated thermostat H, of any suitable form, is provided as a device for varying the resistance of the carbon-pile 17. The thermostat shown here includes an expansible conducting member 18 in series with one side of the line circuit and having its ends fixedly supported or mounted upon one or more insulating supports 19. The central portion of the element 18 is bowed, as indicated, expansion of the element, due to increased heating effect produced by an increase in the current passing through the element, being effective to remove pressure normally exerted upon the short arm of the lever 23, through the operating element 21 secured to the underside of the central part of the bowed portion of the element 18. The other end of the lever 23 bears against an adjustable abutment of the carbon-pile 17, the lever being biased by a spring 24 to a position wherein it exerts minimum pressure against the carbon-pile 17.

The parts of the system shown herein are in normal condition, that is, with normal or full load upon the generator G. At this time, the braking effect exerted by the brake B on the turbine shaft is a minimum or negligible, for the parts are designed so that substantially no effective energizing current passes through the winding 16, the resistance of the carbon-pile at such time being a maximum that can readily be attained without actual open-circuit condition. Due to the fact that full load current is supplied to the lamps L and passes through the conducting element 18 of the thermostat, this conducting element is bowed upward to a maximum extent, thus relieving the short arm of the lever 23 of substantial pressure, the spring 24 being effective at this time to draw the lever 23 to a position wherein it exerts no substantial pressure upon the carbon-pile 17.

As the load on the generator is decreased, as by removing one or more lamps L, the conducting element 18 of the thermostat contracts toward its normal unheated condition and thus exerts more or less pressure upon the short arm of the lever 23, causing the long arm of the lever to compress the carbon-pile resistance and thus decrease the effective resistance of the circuit of the winding 16. Thus, the brake B is energized to an appreciable extent by the winding 16, the extent of this energization being dependent upon the decrease in the generator load from normal or full load value. The design is purposely such that, as one or more increments of electrical load are removed, the effect exercised by the thermostat H and carbon-pile resistance 17 is such as to cause energization of the brake B, through the winding 16, to such an extent that the brake puts a mechanical load on the turbine shaft which is of substantially the same value as the electrical load removed from the generator circuit. Thus, the same total load, made up of the electrical load upon the generator and braking load of the brake B, is always upon the turbine, thereby eliminating any tendency of the latter to vary its speed because of variations in load thereon. Obviously, by elimination of substantial speed variations, the tendency towards variation in the voltage of the generator is eliminated, and there is present a system wherein substantially constant voltage is maintained upon the generator as the electrical load thereon varies.

Figure 2:
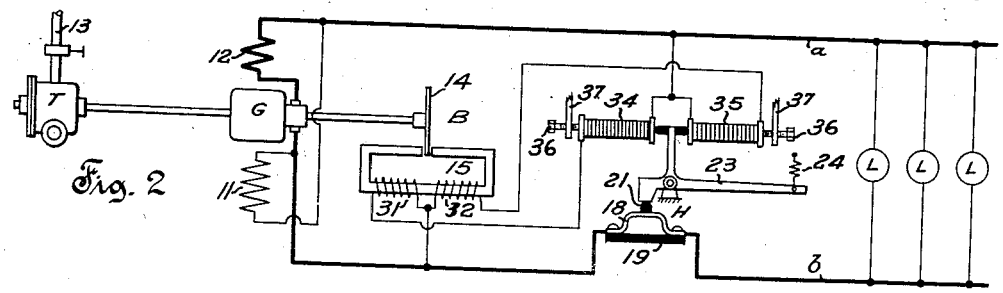

In the modification shown in Fig. 2, the field element of the brake B is provided with two shunt coils 31 and 32 differentially connected so as to produce opposite energizing effects on the field element 15 of the brake. In series with the winding 31 is a carbon-pile resistance 34, and a carbon-pile resistance 35 is in series with the winding 32. The outer terminal abutment of each of the carbon-pile resistances 34, 35 is preferably adjustable, as by means of a screw 36 threaded through a relatively fixed support 37, the arrangement being effective to cause shifting of the terminal abutment as the screw 36 is adjusted. An arm of the lever 23 has operating portions in engagement with opposing terminal abutments of the carbon-piles 34, 35. The operating portion 21 attached to the bowed expansible element 18 of the thermostat H is effective to shift the lever 23, to a degree dependent upon the current in the generator circuit, against the tension of the spring 24.

The parts of the system of Fig. 2 are in the positions which they occupy under conditions of normal or full load on the generator G. Under these conditions, the lever 23 is actuated, against the tension of the spring 24 to a position wherein it bears against the terminals of the carbon-pile resistances 34, 35 with sufficient pressure to cause energizing effects of the differential windings 31, 32 to just neutralize each other. It will be apparent that an exact balance of magnetizing effects of these windings can be readily secured by proper adjustment of the adjusting screws 36. As will be apparent, the brake B exerts no load upon the turbine shaft at this time.

As elements of electrical load are removed from the generator circuit, the distortion of the conducting element 18 of the thermostat decreases and the lever 23 is shifted by its spring 24 so as to cause greater compression of the carbon-pile 34 and less compression of the carbon-pile 35, with the result that the current in the circuit of the winding 31 increases and the current in the winding 32 decreases, the general effect being to cause resultant effective energization of the brake B to a degree proportional to the amount of electrical load removed from the circuit of the generator. The parts are so designed that when there is a minimum or no load upon the generator G, the current in the circuit 31 is a maximum and the current in the circuit in the winding 32 is a minimum, and hence, the brake is energized to a maximum extent. By proper design of the parts of the brake and the control means therefor, the drag or load due to the brake B can be made just equal to the electrical load removed from the generator circuit.

A distinctive feature of the system of Fig. 2 is that, in case the load upon the generator should, for some unforeseen reason, such as a short circuit, be increased considerably above normal, the lever 23 would be shifted by the increased distortion of the conducting element 18 of the thermostat so as to cause compression of the carbon-pile 35 and release of the carbon-pile 34, with consequent increase in the current in the winding 32 and decrease in the current in the winding 31, the general effect being substantial energization of the brake to act as an additional mechanical load to cut down the speed of the turbine and the electrical energy of the generator.

Figure 3:
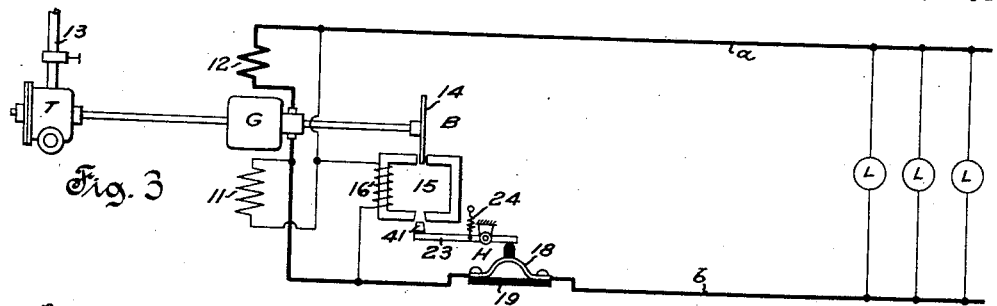

In the modification shown in Fig. 3, the field element 15 of the brake B has a gap therein, and a bridging element 41 of magnetic material is arranged to close this gap and thus decrease the reluctance of the magnetic circuit of the field element to a degree dependent upon the electrical load on the generator. This bridge element 41 is preferably mounted upon and insulated from the pivoted lever 23, the spring 24 biasing the lever to such a position as to cause the bridge 41 to be inserted into full bridging position relative to the field element 15. The expansible conducting element 18 of the thermostat H is effective, on the passage of current therethrough, to remove the bridge 41 from the field circuit 15, against the biasing action of the spring 24, and to a degree dependent upon the electrical load on the generator.

The parts of the system are shown in the positions which they occupy under conditions of normal or full electrical load on the generator. The distortion of the expansible element 18 of the thermostat at this time is such as to fully remove the bridge element 41 from bridging position, as indicated. With the bridge member in this position, the energizing winding 16 has no appreciable energizing effect upon that portion of the field element 15 with which the conductive disk 14 is directly associated. As electrical load is removed from the generator circuit, there is decreased distortion of the element 18 of the thermostat, and the spring 24 is effective to cause the insertion of the bridge 41 in the gap in the field circuit 15, to a degree dependent upon the amount of load removed from the generator circuit. This permits the passage of a considerable flux through the magnet and the conducting disk of the brake B, with the consequent exertion of braking effect on the turbine shaft. By proper design of the parts of the system, the effective energization of the field element 15 and the braking effect exerted by the brake B are made inversely proportional to the electrical load on the generator. As will be apparent, when there is no load on the generator, the spring 23 is effective to shift the bridge member 41 to full bridging position, causing maximum energization and braking effect of the brake. The mechanical braking effect produced by the brake B may be made substantially equal to the electrical load removed from the generator circuit; and in this way, the total load upon the turbine T is maintained substantially constant independently of variations in the electrical load on the generator, with the result that the voltage of the generator is maintained substantially constant under conditions of variable load.

Figure 4:
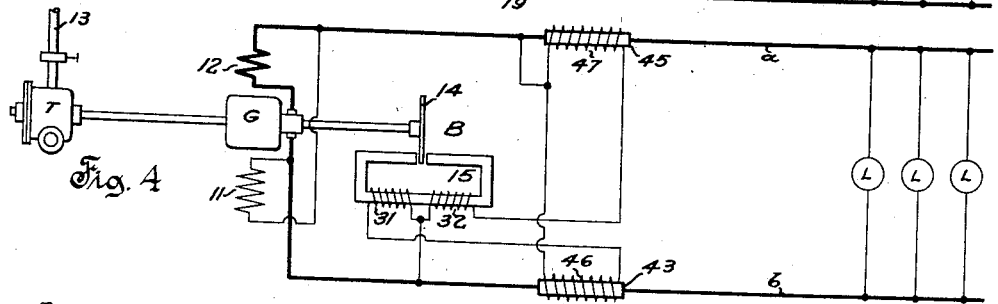

In the modification shown in Fig. 4, the brake is provided with differentially arranged, shunt energizing windings 31, 32. The generator circuit is provided with heating elements 43 and 45 connected in series therewith. These heating elements become heated or produce heat to a degree directly proportional to the current passing therethrough. A resistance element 46 is directly associated with the heating element 43 and is connected in series with the winding 31; and a resistance element 47 is directly associated with the heating element 45 and is connected in series with the circuit of the winding 32. The resistances 46 and 47 are so associated with the heating elements, preferably being wound thereon, as to become heated to a degree dependent upon the currents passing through the heating elements. The resistance element 46 is of such a composition that its resistance decreases as the temperature of the element increases; and the resistance element 47 is of such a nature that its resistance increases as the temperature of the element increases. In other words, the resistance 46 has a negative temperature co-efficient, and the resistance 47 has a positive temperature co-efficient.

The heating elements 43 and 45 and the resistance elements 46 and 47, and also the windings 31, 32 are so designed that when the heating elements 43 and 45 are subjected to the heating consequent to the presence of normal or full load current in the generator circuit, the energizing effects of the windings 31, 32 are just equal and opposite, and there is no consequent resultant energization of the field element 15 of the brake B. As the electrical load on the generator decreases, the heating effects of the heating elements 43 and 45 decrease, and consequently the resistances of the resistance elements 46 and 47 increase and decrease, respectively, with the result that the current in the winding 31 increases and the current in the winding 32 decreases, causing a resultant energization of the field element 15 of the brake, causing the latter to exert a mechanical load or drag on the turbine shaft. By proper design of the parts of the system the braking effect exerted by the brake B is made equal to that portion of the electrical load removed from the generator circuit. In this way, the total load upon the turbine may be maintained substantially constant, and hence, there will be substantially constant voltage on the generator independently of variations in the load thereupon.

Figure 5:
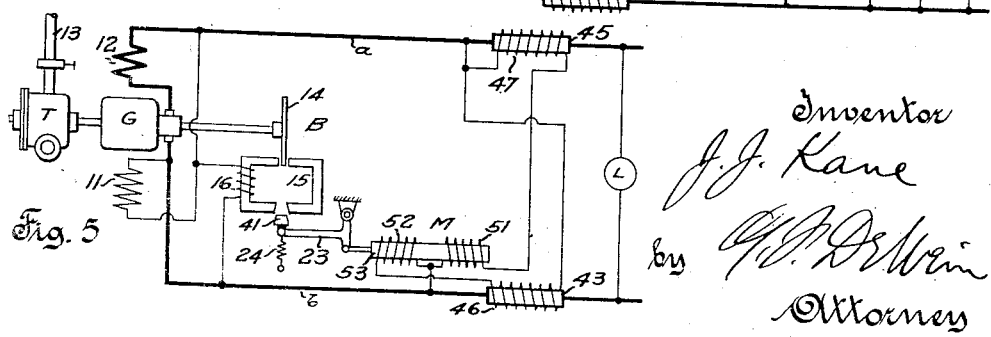

In the modification shown in Fig. 5, the field element 15 of the brake B is provided with a removable or adjustable bridge element 41 effective, when in full bridging position, to substantially close a gap in the magnetic circuit of the field element, but normally biased to a position wherein it has no substantial effect in magnetically bridging this gap. Hence, when the bridge member 41 is in withdrawn position, as indicated, the energizing winding 16 is ineffective to produce any substantial energizing effect upon the conductive element 14 of the brake. An electromagnet M is provided with a core 53 and differentially connected, shunt energizing windings 51 and 52 thereon which are connected in series with the resistance elements 46 and 47, respectively, the latter being arranged in heating relation to the heating elements 43 and 45, respectively, connected in series with the load circuit of the generator. Resistance element 46 has a negative temperature co-efficient and resistance 47 has a positive temperature co-efficient. The core 53 is mechanically connected to an arm of the lever 23 so that effective energization of the core due to a resultant effect of the winding 52 serves to actuate the lever, against the bias of the spring 24, in such a manner as to cause the bridging element 41 to more or less effectively bridge the gap in the circuit of the field element 15 and thus produce effective energization of the brake B. The electromagnet M, the resistances 46 and 47, and the heating elements 43 and 45 are so designed that under conditions of normal or full load on the generator, the electromagnetic effects exerted by the windings 51 and 52 on the core 53 substantially neutralize each other and thus the spring 24 is effective to hold the bridge element 41 fully withdrawn from bridging position.

The parts are shown in the positions which they occupy under conditions of normal or full load on the generator. As the electrical load on the generator is decreased, the resistance of resistance element 47 decreases, and the resistance of resistance element 46 increases, the increased current in winding 52 and decreased current in winding 51 cause a substantial resultant energization of the core 53 of the magnet, this energization being dependent upon the amount of electrical load removed from the generator circuit. The magnet is thus effective to move the bridging element 41 to a position wherein it more or less fully bridges the gap in the field element 15 and permits effective energization of the field element 15 and the conductive disk 14 of the brake so as to put a load upon the turbine shaft which is substantially equal to the electrical load removed from the generator circuit. By proper design of the parts, the load or braking effect exerted by the brake B is substantially equal to the difference between full or normal load and the actual load on the generator; and in this way, there is a substantially constant load on the turbine shaft at all times, thus eliminating any tendency towards variation in speed thereof and maintaining constant voltage on the generator independently of load variations thereon.

In the modification shown in Fig. 6, a relatively high resistance is permanently connected across the major portion of, or even the entire, energizing winding 16, the path of the winding 15 being normally open-circuited at the contacts 62, 63. A voltage responsive electromagnet 65, comprising a core 67 and a voltage responsive winding 68, is provided with movable armature 69, mounted upon and insulated from a relatively light spring arm 70, preferably of conducting material. The movable arm 70 of this magnet is biased to a position wherein the armature 69 is withdrawn from the core 67, either through the resiliency of the arm, itself, or through an adjustable spring 71. The arm 70 is also provided with an operating element 72 which, when the armature 69 is drawn to attracted position, is effective, through operative engagement with an extension of the contact element 62, to cause the latter to engage contact 63 and complete the circuit of the energizing winding 16.

It may be assumed that the design of the magnet 65 is such that under conditions of some definite voltage upon the generator circuit, the value of which voltage may be varied by the adjustable biasing spring 71, the energizing effect due to the winding 68 is just insufficient to cause movement of the armature 69 to attracted position. Under these conditions, there is no energization of the brake B. It may be assumed that these conditions exist when the load on the generator is of normal or full load value. If a portion of the lamp load is removed from the generator circuit, this decrease in generator load may have the effect of raising the speed slightly. This increase in speed is reflected in increased energization of the magnet 65, and the armature 69 is drawn to attracted position, causing closure of the circuit of the energizing winding 16 at the contacts 62, 63. The brake is thus fully energized, and the drag exerted thereby upon the shaft is sufficient to bring the speed and voltage of the generator almost immediately to a value no longer sufficient to hold the armature 69 in attracted position. Hence, the armature is withdrawn by its spring, and the circuit of the energizing winding 16 is again open at the contacts 62, 63. In actual operation with any generator load less than full load, the operation of the electromagnet 65 includes the continuous vibration of the armature 69 and a series of momentary closures of the contacts 62, 63 at a rate just sufficient to produce the required resultant energization of the field element 15 of the brake, thus causing the latter to exert just the required braking effect on the shaft to hold the speed and voltage of the generator practically constant and at substantially normal value.

The action of the voltage responsive magnet or relay 65 in causing just the required amount of energization and braking effect of the brake B is similar to the action of a voltage responsive regulator of the Tirrill type, or of the vibrating spring armature type, such as is used in connection with small lighting systems having variable speed generators, as in the case of automobile lighting systems, where the voltage responsive magnet is effective, on any tendency to increase in voltage, to cause vibration of the relay armature, usually for the purpose of removing a normal short-circuit about a resistance connected in series with the energizing field of the generator. As is usual with this type of relay, the make-and-break action at the relay contacts goes on continuously and with such rapidity, that, due to the sluggish action of the field magnet of the machine or its exciter, or any device controlled, a uniform normal voltage is maintained at the point on the circuit where the voltage regulating magnet is connected. Obviously, the most desirable effects are obtained in a relay wherein the armature possesses very little inertia and has a relatively high natural period of vibration.

In order to render the voltage responsive magnet 65 sensitive to any degree desired, a resistance 73 may be inserted in series with the winding 68. This resistance is normally short-circuited by means of a contact 74 in engagement with the spring mounting 70 of the armature, the armature mounting being connected to one terminal of the resistance. As will be apparent, when the armature is moved to attracted position, this normal short-circuit about the resistance 73 is broken and the latter is put in series with the winding 68, the effect of this being that, depending upon the value of the resistance 73, the armature 69 may be withdrawn by its spring at the moment when the generator voltage reaches an almost inappreciable value above normal, or, if desired, just when the voltage reaches normal value.

It will be apparent that, with the parts of this voltage responsive relay properly dimensioned, the relay is effective to maintain the required energization and braking effect of the brake B, thus causing the maintenance of a constant total load upon the turbine and constant voltage on the generator circuit. Hence, this system of Fig. 6 is operative to maintain the voltage on the generator circuit substantially constant in spite of variations in the electrical load on the generator.

In the modification shown in Fig. 7, the parts are substantially the same as those of the system shown in Fig. 2, the main difference being that the lever 23 is actuated by a voltage responsive magnet having a core 81 and a winding 82. The lever 23 is biased by a spring 24 to a position wherein it engages an adjustable stop 83. When the parts are in the positions shown in the drawings, the resistances of the carbon-piles 34, 35 are adjusted by means of the screws 36 so that the energizing effects of the differentially connected windings 31, 32 are equal and, consequently, there is no effective energization and braking action of the brake B. As portions of the generator load are removed from circuit, there is a tendency towards increase in speed and voltage of the generator. A slight increase in voltage, which may be negligible in so far as regulation is concerned, is reflected in the voltage responsive magnet 81, 82, and the lever 23 is shifted so as to cause compression of the carbon-pile 34 and release of the carbon-pile 35, thus causing increased current in the winding 31 and decreased current in the winding 32 and producing a resultant flux in the field member 15 and consequent energization of the brake B. As the effect of a slight increase in voltage is immediately reflected in a substantial braking effect exerted by the brake B, and this braking effect if continued for an extended period, may be sufficiently great to pull the voltage back to normal, or even below normal, the turbine and the generator speed and voltage are caused to decrease or rather are prevented from increasing to any value beyond that corresponding to substantially constant generator voltage. Hence, there is present in this system a voltage responsive, regulating device which is effective to maintain the voltage of the generator substantially constant independently of variations in load thereupon.

In the modification shown in Fig. 8, the field element 15 of the brake B is provided with a removable bridge element 41 of magnetic material, effective in one position to substantially bridge a gap in the field circuit and thus reduce the reluctance of the field element to a minimum. This bridging element is mounted on and insulated from the lever 23, the latter being biased to a position wherein the bridging element is withdrawn from bridging position. An electromagnetic device, comprising windings 85 and 86 arranged in inductive relation to cores 87 and 89, respectively, and connected in series across the generator terminals, is arranged to cause actuation of the lever 23. The windings 85, 86 are so dimensioned that their ampere-turns are equal, and the windings are so disposed on the respective cores that the forces exerted by the several cores on the lever 23 are in opposite directions. The core 89 is of such dimensions as not to become saturated under any conditions of operation which the system may meet with, while the core 87 is designed to become saturated when energized to an extent corresponding to normal voltage on the generator circuit.

Under conditions of full load and normal voltage on the generator circuit, there is no effective resultant pull on the lever 23, for the effects of the equal ampere-turns of the windings 85 and 86 on the cores 87 and 89 just neutralize, and the lever remains in the position shown, wherein the bridging element 41 is withdrawn from effective bridging position. Assume that one or more increments of electrical load are removed from circuit; then the slight increase in turbine speed and the consequent slight increase in voltage are sufficient to cause such unbalancing of the forces acting on the lever 23 as results in shifting the lever 23 so as to insert the bridging element 41 to a greater or less extent in the gap of the field circuit 15. This unbalancing of forces on the lever 23 results from the fact that the pull on the saturated core 87 does not increase appreciably, while the pull on the unsaturated core 89 does increase with the slight increase in voltage. With the element 41 more or less effectively bridging the gap in the field circuit 15 and thus reducing its reluctance, the winding 16 effectively energizes the field circuit and the conductive disk 14 of the brake B, causing the latter to produce a braking effect upon the turbine shaft that is dependent upon the position of the bridging element 41. By proper design of the parts, a relatively small increase in generator voltage is effective to produce sufficient decrease in the reluctance of the field circuit 15 and consequent braking effect of the brake B to hold the speed and voltage of the generator at a substantially normal value. Thus, this system includes means for maintaining the voltage of the generator substantially constant in spite of variations in load thereon.

In the modification shown in Fig. 9, the differentially connected, shunt energizing windings 31, 32 of the brake B are provided with resistances 91 and 92, the resistance 91 being in series with the winding 31, and the resistance 92 in series with the winding 32. There is a short circuit connection about the resistance 91, this short circuit connection being normally open at the contacts 93, 94; while a short circuit connection about the resistance 92 is normally closed at the contacts 93, 95. The windings 31 and 32 and resistances 91 and 92 are so designed that, with the resistance element 91 connected in series with the winding 31, the energizing effect of the latter winding is just equal and opposite to the energizing effect of the winding 32, when the resistance 92 is removed from the circuit of the latter winding, as by being short-circuited at the contacts 93, 95. The voltage responsive electromagnetic relay device 65 may be similar to that of Fig. 6, except that it has the additional function of separating the normally closed contacts 93, 95 when the armature 69 is in attracted position.

With the parts as shown in the drawings, any tendency towards an increase in generator voltage is immediately reflected in the voltage responsive magnet 65, causing attraction of the armatures 69 thereof, with the consequent opening of the short-circuit about the resistance 92, at contacts 93, 95, and closure of the short-circuit about the resistance 91 in the circuit of the winding 31. The effect of this change in circuit connections is to produce a very substantial resultant flux in the field element 15 and the resultant energization of the brake B, thereby producing a powerful braking effect on the turbine shaft. As was described in connection with Fig. 6, the voltage responsive device may produce a more or less rapid vibration of the armature 71, depending upon the electrical load upon the generator circuit, thus producing the required resultant energization of the field element 15 and a resultant braking effect on the turbine shaft which is just equal to the electrical load removed from the generator circuit. In this way, there is present a system wherein the generator voltage is maintained substantially constant in spite of variations in the electrical load on the generator.

It will be apparent that, in all of the systems described, the brake B is substantially unenergized under conditions of normal or full load upon the generator, and, hence, there is no loss of power due to any mechanical drag exerted by the brake upon the turbine shaft; and any appreciable braking effect is present only when the electrical load on the generator is less than normal or full load value. Further, the various designs or systems are effective to cause the production of the desired braking effects for the purpose of maintaining constant voltage upon the generator independently of variations in load thereon.

It should be understood that it is not desired that the invention claimed be limited to the exact details of construction shown and described herein, for obvious modifications will occur to persons skilled in the art.

It is claimed and desired to secure by Letters Patent:

1. In combination, an electric generator, a supply circuit connected thereto, a variable load for said supply circuit, and means for maintaining the voltage of said generator substantially constant, said means comprising a variable magnetic drag for said generator comprising a plurality of differentially connected, shunt energizing windings.

2. In combination, a generator, means for driving said generator, and an electromagnetic brake associated with said generator and comprising a disk of conductive material, and means for producing an effective magnetic field for said disk that varies inversely as the load on said generator, said means comprising differentially connected, shunt energizing windings on said brake.

3. In combination, an electric generator, a supply circuit connected thereto, a variable working load connected to said supply circuit, and a magnetic drag device for said generator including an energizing winding comprising differentially connected, shunt windings, and means for causing the effective energization of said brake due to said windings to vary inversely as the load on said generator.

4. In combination, an electric generator, and means for controlling said generator to maintain substantially constant a characteristic of the energy supplied by said generator, said means comprising an electromagnetic brake under the joint control of differentially connected shunt windings.

5. In combination, a generator operative to supply a power circuit of variable load requirements, and means for preserving substantially constant a characteristic of the electrical energy supplied by said generator, said means comprising a magnetic circuit having a gap portion, and a movable element electromagnetically associated with said gap portion, and means for causing the effective energization of said magnetic circuit to vary inversely as the load on said generator, said means comprising a plurality of differentially connected windings in shunt to said generator and operatively associated with said magnetic circuit.

6. In combination, an engine, a generator driven thereby and operative to supply a power circuit of variable load requirements, and means for exercising a controlling effect on the speed of said engine, said means comprising a plurality of windings connected in shunt to said generator, and devices for utilizing variable differential effects of said windings.

7. In combnation, a generator operative to supply a circuit subject to a variable load, and means for exercising a controlling effect on the voltage of said generator, said means comprising an electromagnetically actuated brake for said generator, and controlling devices for said brake comprising a plurality of windings, one of said windings being connected in shunt to said generator, and means for causing the production of and utilizing differential effects of said windings, said latter means including devices responsive to the load on said generator for varying the resistance of the circuit of a second one of said windings.

8. In combintion, a generator operative to supply a power circuit of variable load requirements, and means for preserving substantially constant the voltage of the electrical energy supplied to said circuit by said generator, said means comprising a plurality of differentially connected windings in shunt to said generator, devices for utilizing variable differential effects of said windings, and a variable resistance device for exercising a controlling effect on the current in at least one of said windings, and means responsive to a characteristic of the energy supplied by said generator for actuating said resistance device.

9. In combination, a generator operative to supply a power circuit of variable load requirements, and means for preserving substantially constant a characteristic of the electrical energy supplied by said generaor, said means comprising a plurality of windings, and devices for causing the production of and utilizing variable differential effects of said windings, and a resistance devce operatively associated with the circuits of said windings for inversely varying the resistance of the several windings.

10. In combination, an electric generator adapted to supply variable load, and means for controlling said generator to maintain substantially constant voltage thereon, said means comprising a brake, and a plurality of windings connected in shunt to said generator, and instrumentalities for causing the production of differential effects by said windings and for causing the effective energization of said brake to vary in response to said differential effects.

11. In combination, an engine, an electric generator adapted to be driven thereby, a supply circuit connected thereto, and means for maintaining the voltage of said generator substantially constant in spite of a tendency of said engine to operate at variable speed, said means comprising an electromagnetically actuated brake having a plurality of differentially connected energizing windings connected in shunt to said generator, and means responsive to the load on said generator for controlling the energizing effect of one of said windings.

12. In combination, an electrical power circuit, and means for controlling a characteristic of the electrical energy of said circuit, said means comprising electro-magnetically actuated controlling instrumentalities including a plurality of differentially connected energizing windings in shunt to said crcuit, and means associated with said windings for insuring the production of a resulting energizing effect which varies with variations in a characteristic of the energy of said circuit.

13. In combination, an electrical power circuit, means for supplying energy thereto, and a controlling device therefor, said controlling device comprising a magnetizable core of variable reluctance, an energizing winding for said core, and means responsive to the energy of said power circuit for varying the reluctance of said core, said latter means comprising a winding connected in shunt to said power circuit.

14. In a regulator system, the combination with a dynamo-electric machine having an armature and a field-magnet winding, of regulating means therefor comprising a magnetizable core having an air gap therein, an energizing coil and intermittently operating means for varying the magnetic field in said air gap.

15. In a regulator system, the combination with a dynamo-electric machine having an armature and a field-magnet winding, of regulating means therefor comprising a magnetizable core, an energizing coil and intermittently operating means for varying the flux density of said core.

16. In a regulator system, the combination with a dynamo-electric machine having an armature and a field-magnet winding, of regulating means therefor comprising a magnetizable core, an energizing coil and intermittently operating means governed from said armature for varying the flux density of said core.

17. In a regulator system, the combination with a dynamo-electric machine having an armature winding and a field-magnet winding, of regulating means therefor comprising an electromagnet having a magnetizable core, an air gap therein, and an energizing coil for said core; and a second electromagnet having an energizing coil, a movable armature and a pivoted lever controlled by said electromagnet armature, said lever having a depending arm extending into said air gap and moved therein by said electromagnet armature.

18. In a regulator system, the combination with a dynamo-electric machine having an armature winding and a field-magnet winding, of regulating means therefor comprising an electromagnet having a magnetizable core, an air gap therein and an energizing coil for said core; a second electromagnet having a movable armature; a pivoted lever controlled by said movable armature and an arm extending into said air gap and actuated by said lever.

19. In a regulator system, the combination with a dynamo-electric machine having an armature and a field-magnet winding, of regulating means therefor comprising a plurality of electromagnets connected in parallel relation, a magnetizable core associated therewith and having an air gap therein and means governed by one of said electromagnets and having other means cooperating therewith for varying the flux density of said core.

In testimony whereof, the signature of the inventor is affixed hereto.

JOHN J. KANE.